United States Patent [19]
Linde et al.

[11] Patent Number: 5,634,970
[45] Date of Patent: Jun. 3, 1997

[54] PROCESS FOR THE COLORATION OF ORGANIC MEDIA

[75] Inventors: Günter Linde, Krefeld; Manfred Eitel, Kempen, both of Germany

[73] Assignee: Bayer AG, Leverkusen, Germany

[21] Appl. No.: 323,734

[22] Filed: Oct. 17, 1994

[30] Foreign Application Priority Data

Oct. 27, 1993 [DE] Germany .................. 43 36 612.0

[51] Int. Cl.$^6$ .................................................. C09C 1/36
[52] U.S. Cl. .................. 106/437; 106/438; 106/439; 106/453; 106/456; 106/459
[58] Field of Search .................... 106/437, 438, 106/439, 453, 456, 459

[56] References Cited

U.S. PATENT DOCUMENTS

| | | | |
|---|---|---|---|
| 4,102,967 | 7/1978 | Vanderveen et al. | 264/113 |
| 4,946,505 | 8/1990 | Jungk | 106/712 |
| 5,108,508 | 4/1992 | Rademachers et al. | 106/437 |

FOREIGN PATENT DOCUMENTS

| | | |
|---|---|---|
| 0144940 | 6/1985 | European Pat. Off. . |
| 0257423 | 3/1988 | European Pat. Off. . |
| 0373426 | 6/1990 | European Pat. Off. . |
| 0418683 | 3/1991 | European Pat. Off. . |
| 0424896 | 5/1991 | European Pat. Off. . |
| 0567882 | 11/1993 | European Pat. Off. . |
| 2692587 | 12/1993 | France . |
| 3132303 | 2/1983 | Germany . |
| 3841848 | 6/1990 | Germany . |

OTHER PUBLICATIONS

Orbit Abstract of EP 0 257 423 (Mar. 2, 1988), AN 88–057204/09.
Orbit Abstract of EP 0 373 426 (Jun. 20, 1990). AN 90–186892/25.
Orbit Abstract of DE 38 41 848 (Jun. 21, 1990). AN 90–186892/25.
Orbit Abstract of EP 0567 882 (Nov. 3, 1993). AN 93–346327/44.
Orbit Abstract of FR 2 692 587 (Dec. 24, 1993). AN 94–000821/01.
Orbit Abstract of DE 31 32 303 (Feb. 24, 1983). AN 83–20254k/09.
Orbit Abstract of EP 0 424 896 (May 2, 1991). AN 91/126428/18.
Orbit Abstract of EP 0144940 (Jun. 19, 1985). AN 85–146534/24.
DIN 5033, *Colorimetry; tristimulus method*, Aug. 1976.
DIN 5033, *Colorimetry; basic concepts*, Mar. 1979.
DIN 5033, *Colorimetry by visual matching*, Jan. 1981.
DIN 5033, *Colorimetry; reflectance standard for colorimetry and photometry*, Mar. 1982.
DIN 5033, *Colorimetry; measuring conditions for lights sources*, Apr. 1982.
DIN 51 562, *Viscometry; measurement of kinematic viscosity by means of the Ubbelohde viscometer; standard type*, Jan. 1983.
DIN 5033, *Colorimetry; measuring conditions for object colours*, Jul. 1983.
DIN 51 562, *Viscometry; measurement of kinematic viscosity by means of the Ubbelohde viscometer; viscosity relative increment at short flow times*, May 1985.
DIN 51 506, *Lubricants; VB and VC lubricating oils with and without additives and VDL lubricating oils; classification and requirements*, Sep. 1985.
DIN 53 775, *Testing of colouring materials in plastics; Testing of colouring materials in plasticized polyvinyl chloride (PVC–P) materials; Determination of the dispersion hardness by two roll milling*, May 1988.

(List continued on next page.)

*Primary Examiner*—Mark L. Bell
*Attorney, Agent, or Firm*—Connolly & Hutz

[57] ABSTRACT

The present invention relates to a process for the colouration of organic media by granulated inorganic pigments.

13 Claims, 1 Drawing Sheet

OTHER PUBLICATIONS

DIN 51 562, *Viscometry; measurement of kinematic viscosity by means of the Ubbelohde viscometer; micro Ubbelohde viscometer*, Dec. 1988.

DIN 5033, *Colorimetry; standard colorimetric systems*, May 1992.

DIN 5033, *Colorimetry; Spectrophotometric method*, Jul. 1992.

DIN 5033, *Colorimetry; Colorimetric measures*, Jul. 1992.

DIN 6174, *Colorimetric evaluation of colour differences of surface colours according to the CIELAB formula*, Jan. 1979.

Perry'Chemical Engineers' Handbook, 6th ed. McGraw–Hill, 1984, pp. 8–60 to 8–68. TP1515.P45.

PROCESS FOR THE COLORATION OF ORGANIC MEDIA

The present invention relates to a process for the colouration of organic media by granulated inorganic pigments.

In order to achieve the optimum colour effect, the processing of pigments requires a grinding of the pigments to primary particles. The powders formed as a result of this give off dust very strongly and tend to adhesion, owing to their fine state of division, and stick in dosing systems. In the case of toxicologically dangerous substances, therefore, measures must be taken during the processing to avoid the endangering of man and environment by the dusts formed. However, even in the case of completely harmless, inert substances such as iron oxide pigments, the avoidance of dust nuisance is increasingly required by the market.

The objective in the handling of pigments is therefore the avoidance of dust and improved dosing based on good flow properties in order to achieve a qualitatively uniform colour effect on the use of organic media. This objective is reached to a greater or less extent by the application of granulation processes to pigments. Pelletizing or spray granulation are generally used in this connection. Compacting processes have been less suitable up to now because of the limited dispersibility of the granulated materials obtained thereby.

When granulated pigments are used, the market basically demands of the pigments two properties in opposite directions: mechanical stability of the granulated material and good dispersion properties. The mechanical stability is responsible for good transport properties, both for transport between manufacturer and user and for good dosing and flow properties during the use of the pigments. It is brought about by high adhesive forces and depends e.g. on the amount of binder or else on the compaction pressure during the change of shape. The dispersibility, on the other hand, is influenced by a good grinding before the granulation (wet and dry grinding), the mechanical energy during the working-in (shear forces) and dispersion aids, which at once reduce the adhesive forces in the dry granulated material during the working into a medium. In pigments, though, the use of fairly large quantities of dispersion aids is restricted owing to the cost ratio additive/pigment. In addition, a high proportion of additive causes a corresponding reduction of the tinting strength or of the scattering power. Since the fluctuations of tinting strength are in general below ±5%, the use of additives is also limited, even when they act simultaneously as adhesion promoter and dispersion aid. The additives must also not adversely change the use properties, for example the strength or the notch impact strength in the case of plastics or the elastic properties in the case of elastomers (polymers).

Possible production processes for granulated pigments according to the prior art are spray granulation (spray drying via disc or nozzle) and pelletizing (mixer, fluidized bed granulator, disc or drum).

Thus in EP-A 0 257 423 and DE-A 3 841 848, spray granulation with the use of polyorganosiloxanes as hydrophobic, lipophilic additives is described. The spray dryer mentioned leads in general to small particle sizes, that is a high fines component. That means that a considerable proportion of the material is not obtained as a directly usable granulated material but is only retained as a fines component in the filter and must then be returned into the process.

Hydrophobing after-treatment leads in the case of spray-granulated products to a very well flowing but extraordinarily strongly dusting granulated material.

EP-A 0 424 896 discloses the production of low-dust fine granulated materials in one production operation in known intensive mixers. In this case a low content of waxes is used in combination with emulsifier and wetting agents by application of an aqueous dispersion. Water contents of 20 to more than 50% are in general obtained in the course of this. These granulated materials must initially be dried and separated from oversize and undersize materials.

DE-A 31 32 303 describes low-dust, flowable granulated inorganic pigments that are mixed with binders liquefying under the effect of heat and are granulated by a screening process with application of a screening aid (pressure). In the course of this ca. 10 to 20% of the throughput is obtained as a fines fraction <0.1 mm.

From EP-A 0 144 940 there come low-dust granulated pigments that, starting from filter sludge with ca. 50% water are mixed at 50° to 200° C. by addition of 0.5–10% of surface-active substances and additional mineral oil or liquefying waxes up to the lubricating point. The process occurs in intensive mixers, and the product is optionally after-granulated and after-dried. Water is still present at a concentration of 10 to 15% in the end product, which is unfavourable for the working into plastics.

The other processes also are limited in their application. Spray granulation, owing to drop formation, requires the use of well flowable and therefore low-viscosity suspensions. For the drying process, therefore, a larger amount of water has to be evaporated than in the frequently applicable fluidized bed drying from highly pressure-dried pigment filter pastes. This leads to higher energy costs.

In the case of pigments previously produced by calcination, spray granulation signifies an additional process step with high energy costs. In addition, during spray granulation a more or less large proportion of fine material accumulates in the spray filter and must be recycled again into the production.

Frequently, pelletizing also has disadvantages. Starting from pigment powder, it can be carried out in mixers with high turbulence, in the fluidized bed process or also by pan and drum granulation. All these processes have in common a high requirement for binder, usually water, so that drying must follow as an additional process step.

Granulated materials of different sizes also are obtained in this case, especially when insufficient binder is available for the amount of powder or the distribution is not the optimum. A certain proportion can then become too large as granulated material, while on the the other hand components which are too small and therefore still dusty are present. A classification of the granulated materials formed is therefore necessary, with the recycle of over- and undersize materials.

Pan granulation leads to granulated materials with a broad spectrum of particle sizes. Where this is undesirable because of the poor dispersibility of too large particles, the granulation process must be followed by intensive personal supervision and the production of granulated material optimized by manual control of the amount of nuclei. Usually a classification with recycle of the over- and undersize material also occurs in this process.

It was, however, the object of the present application to provide a process for the colouration of organic media that avoids the previously described disadvantages of spray granulation or of pelletizing in their application to inorganic pigments and provides sufficiently stable, dosable, low-dust granulated materials of equally good dispersibility as the powders previously used. Moreover, a classification with recycle of over- and undersize material should be avoided.

It has now been found that this object can be achieved by a multistage combination of the process stages of mixing, compacting, screen granulating and pan granulating.

The invention accordingly provides a process for the colouration of organic media with granulated inorganic pigments, wherein the inorganic pigment is granulated in a multistage process with the addition of oils having a kinematic viscosity at 40° C. of 1.6 to 1500 mm²/s as binders to granulated pigments of an average particle size of 0.2 to 2 mm without the recycling of a fines component and the granulated inorganic pigments are mixed with the organic media.

According to the process of the invention, a granulated pigment is obtainable that at a $d_{50}$ of 0.2 to 2 mm can be worked into organic media without difficulty.

Preferred inorganic pigments for the purposes of this invention are iron oxide pigments, titanium dioxide pigments, chromic oxide pigments and/or rutile mixed-phase pigments.

Substances improving the adhesive forces (cohesion) are used as binder. Water and aqueous solutions are available as such. Oils of various origins also can be used. In addition to technical or synthetic oils such as Machine Oil V 100 or silicone oils (polysiloxanes), biodegradable oils of vegetable and animal origin such as rapeseed oil, soya bean oil, maize germ oil, olive oil, coconut oil, sunflower oil or fish oil also can be used.

Preferred embodiments are put forward in the subclaims.

It is essential in the multistage granulation process according to the invention that in the first stage a sufficiently cohesive homogeneous material be produced by addition of the binder in a mixer. In the second stage a compacting preferably occurs.

The most important characteristic with regard to process engineering in the course of this is the compressive force (kN) per cm width of roll (line force). A linear transfer of the compressive force in the compacting is assumed, since an area of compression cannot be defined and a pressure (kN/cm²) therefore cannot be calculated.

The compaction should preferably be carried out with very low line forces. The line forces used are in general in the lowest range of the commercially available equipment, for example between 0.1 and 15 kN/cm. The adhesive forces within the flakes together with the conditions in the following screen granulator (e.g. the flake crusher of the firm of Bepex GmbH, D-74211 Leingarten or the firm of Frewitt, Fribourg/Switzerland) determine the size of the pregranulate (nucleus) and the ratio between nucleus and powder. The line forces preferably amount to 0.5 to 10 kN/cm.

The optimum particle size of the granulated materials for building material is set by the aforementioned ratio and the residence time in the following pelletizing. At the same time, as a result of the correct ratio between pregranulate and powder, practically the whole amount of pigment is converted into free-flowing, low-dust granulated material. The recycle of over- and undersize material is omitted.

This pelletizing by rerolling can be carried out without any problem according to the prior art by the person skilled in the art on ordinary commercial rotating pans, dragee drums or rotating drums.

The dispersibility in plastics was tested by instructions approximating to DIN 53 775 Part 7: Testing of colouring materials in plasticized polyvinyl chloride (PVC-P) materials; determination of the dispersion hardness by two-roll milling. The pigment to be tested is dispersed in PVC at 160°±5° C. on a mixing mill. The rolling sheet obtained is divided and one half then subjected to elevated shear forces by rolling at room temperature. The applicable measure of dispersibility is for coloured pigments the colour difference ΔE according to CIELAB (DIN 5033, 6174) between hot- and cold-rolled PVC rolling sheet and for white pigments the difference of the standard colour values Y (DIN 5033) between hot- and cold-rolled PVC rolling sheet. A well dispersible pigment is already dispersed out at low shear forces, while for dispersing out a poorly dispersible pigment the elevated shear forces as a result of rolling at low temperature are necessary. It is therefore valid that the smaller the colour difference ΔE or the difference between the standard colour values Y, the better dispersible is the pigment. The dispersibility is of great importance, in particular in the case of granulated materials, since the particles of the granulated material that have to be dispersed in the plastic must first be broken down. The aim for granular materials is a dispersibility equally as good as the corresponding pigment powder, so that the characteristic magnitudes ΔE and Y for powder and granulated material shall not differ significantly.

Good dispersibility according to the prior art is represented for granulated white pigments by a ΔY of 2.1 to 3.0 units, as is achieved, with commercial products on the market, with respect to granulated $TiO_2$ materials, e.g. Bayertitan R-FK-21 (commercial product of Bayer AG); and for coloured pigments by a ΔE of 0 to 1 units, as is achieved with respect to Bayferrox 130 (commercial product of Bayer AG).

The flow behaviour is tested by examining the outflow behaviour from a funnel with 300 to 1000 ml volume and an 8 mm opening. The flow behaviour is designated as good if the material runs out freely. If the material does not flow, or does so only after knocking, the flow behaviour is regarded as inadequate.

BRIEF DESCRIPTION OF THE DRAWINGS

In the process according to the invention, different granulation apparatuses, which are known as individual processes, are used in succession in special coordination with each other in a particular sequence (FIG. 1). These are a mixer (1), a compactor (2), a rough-grinder (3) and a rotating pan (4). These individual processes alone or in other combinations do not lead to the granulated materials according to the invention with the advantageous properties with regard to yield (practically no dust component), flow behaviour, transportability, dispersibility and little effort on control during production. This is made clear in the following table, wherein the sum of the positive properties should be considered (Table 1).

The present invention is explained in the following by means of examples, which are not to be regarded as limiting it.

EXAMPLE 1

Figure 1:
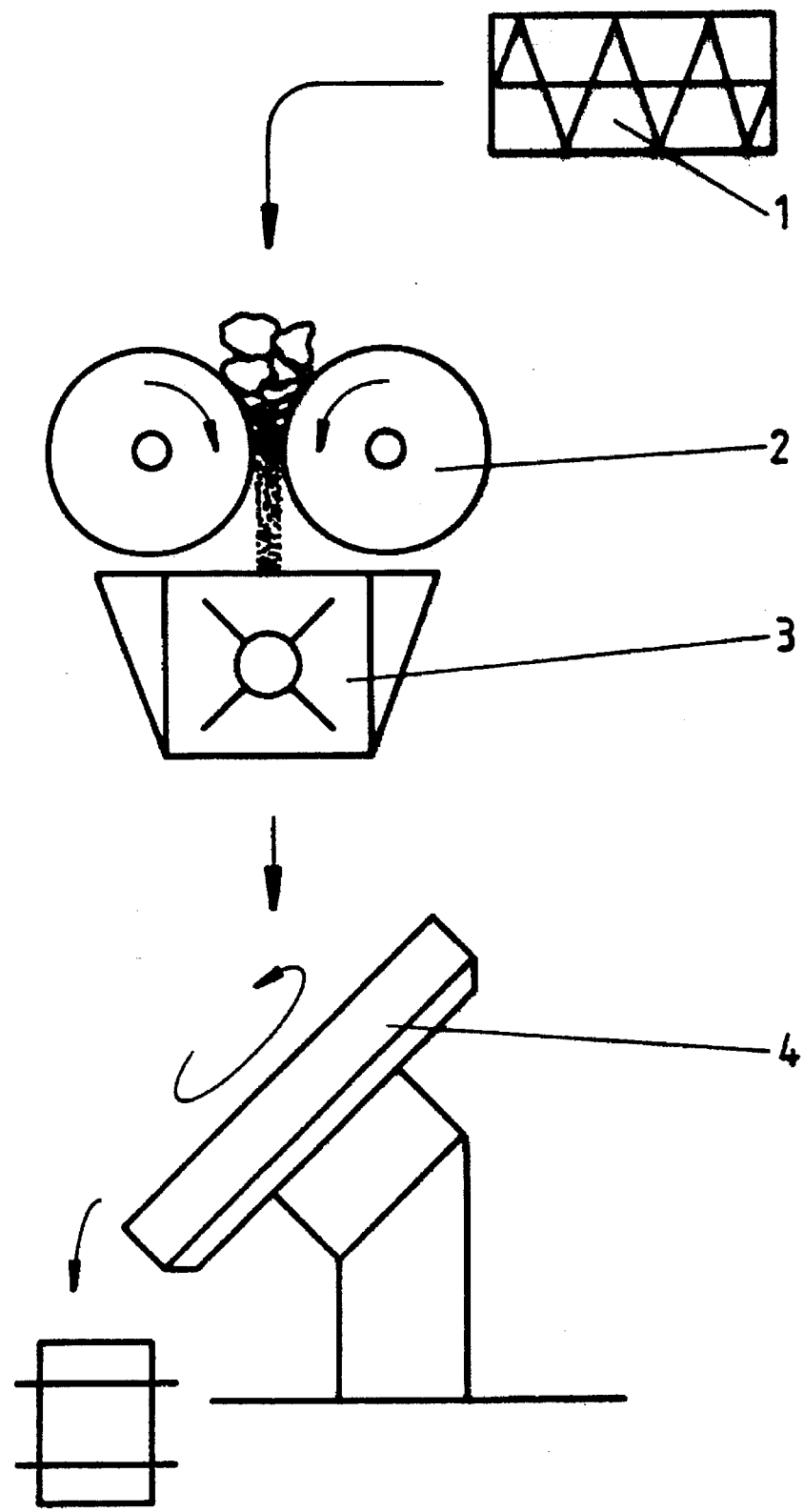

25 kg of iron oxide red Bayferrox 120 N (commercial product of Bayer AG) were charged with 1.5% (375 g) silicone oil Baylube VP FE 3024 (commercial product of Bayer AG, kinematic viscosity at 40° C., 60 mm²/s (DIN 51 562)) to a mixer and mixed intensively. This mixture was compacted in a compactor (Pharmapaktor Bepex 200/50, firm of Bepex) at a line force of 2 kN/cm. Flakes of 2–3 mm thickness were formed. These flakes were rough-ground in a screen granulator (firm of Frewitt, Fribourg/Switzerland) with a screen of mesh size 2 mm. The pregranulate with the powder formed during the rough-grinding was granulated on a granulating pan of 70 cm diameter and a residence time of 7–10 minutes. The granulated material formed had a grain size of 0.2 to 2 mm with a $d_{50}$ of 0.56 mm. It was practically dust-free, very well flowable and sufficiently stable in transport. The measurement of the dispersibility in plastics yielded for the granulated material a colour difference ΔE of 0.3 compared with a difference of 0.2 for the corresponding pigment powder.

EXAMPLE 2

50 kg of an intermediate for titanium dioxide R-FK-2 (commercial product of Bayer AG) with the addition of 1.5% (750 g) of the above-mentioned silicone oil Baylube VP FE 3024 were charged to a mixer and mixed intensively. This mixture was compacted in a compactor (Pharmapaktor Bepex 200/50, firm of Bepex) at a line force of 4–7 kN/cm. Flakes of 2–3 mm thickness were formed. These flakes were rough-ground in a screen granulator (firm of Frewitt, Fribourg/Switzerland) with a screen of mesh size 1.5 mm. The pregranulate with the powder formed during the rough grinding was granulated on a granulating pan of 70 cm diameter and a residence time of 7–10 minutes.

The granulated material formed had a grain size of 0.2 to 2 mm with a $d_{50}$ of 0.5 mm. It was practically dust-free, very well flowable and sufficiently stable in transport. The measurement of the dispersibility in plastics yielded for the granulated material a difference of the standard colour values Y of 1.7, compared with a difference of 3.0 for the ungranulated pigment powder used.

EXAMPLE 3

In each case 50 kg of an intermediate for titanium dioxide R-FK-2 (commercial product of Bayer AG) was granulated as described in Example 2 with additions of 1.5% (750 g) of each of the following oils:

a) Silicone oil Baylube VP FE 3024 (commercial product of Bayer AG, kinematic viscosity at 40° C. 60 mm$^2$/s (DIN 51 562)).

b) Silicone oil Baysilone M 350 (commercial product of Bayer AG, kinematic viscosity at 40° C. 350 mm$^2$/s (DIN 51 562)).

c) Machine Oil V 100 (lubricating oil according to DIN 51 506 VDL, kinematic viscosity at 40° C. 100 mm$^2$/s)

The granulated materials obtained had grain sizes of 0.2 to 2 mm. They were practically dust-free, very well flowable and sufficiently stable in transport. The measurement of the dispersibility in plastics yielded for the granulated material differences of the standard colour values Y of a) 1.1, b) 1.6, c) 1.3 compared with a difference of 2.4 for the ungranulated pigment powder used.

EXAMPLE 4

75 kg chromic oxide GN (commercial product of Bayer AG) were granulated as described in Example 1 with the addition of 3% (2.25 kg) of Machine Oil V 100 (lubricating oil according to DIN 51 506 VDL, kinematic viscosity at 40° C. 100 mm$^2$/s). The line force in the compacting stage was here 3–4 kN/cm.

The granulated material formed had a grain size of 0.2 to 2 mm. It was practically dust-free, very well flowable and sufficiently stable in transport. The measurement of the dispersibility in plastics yielded for the granulated material a colour difference ΔE of 0.5, compared with a difference of 0.3 for the corresponding pigment powder.

EXAMPLE 5

50 kg in each case of the rutile mixed phase pigment Light Yellow 6 R (commercial product of Bayer AG) were granulated as described in Example 1 with the addition of 3% (1.5 kg) of the aforementioned oils Baylube VP FE 3024 and Machine Oil V 100.

The granulated materials obtained had grain sizes of 0.2 to 2 mm. They were practically dust-free, very well flowable and sufficiently stable in transport.

COMPARATIVE EXAMPLE 1

50 kg of an intermediate for titanium dioxide R-FK-21 (commercial product of Bayer AG) were granulated as described in Example 3, but without the addition of oil.

The granulated material formed had grain sizes of 0.2 to 2 mm. It was dust-free and flowable. The measurement of the dispersibility in plastics, however, yielded for the granulated material a difference of the standard colour values Y of 4.8, compared with a difference of 2.4 for the ungranulated pigment powder used.

COMPARATIVE EXAMPLE 2

Titanium dioxide R-FK-21 (commercial product of Bayer AG), that had been granulated by means of a spray drier, had a grain size of 40–300μ with a $d_{50}$ of 120μ and a fines fraction <100μ of between 20 and 40%. The measurement of the dispersibility in plastics yielded for the spray-granulated material a difference of the standard colour values Y of 3.0.

TABLE 1

Combinations of the process steps mixer (A), compactor (B), screen granulator (C), pan granulator (D)
Examination of the properties of the granulated materials, flow behaviour and transportability

| | | | Examination of granulated material | | |
| --- | --- | --- | --- | --- | --- |
| No. | Combination | | transport-ability | flow test | powder component <125μ |
| 1 | A | dust component too high at binder contents <10% | — | | **) |
| 2 | B | high line-forces →poor dispersibility | | — | 1–3% |
| | | low line-forces → poor flow behaviour, dust component | | — | 3–10% |
| 3 | C | too little strength, dust component | | — | **) |
| 4 | D | controllable only with great effort; coarse and dust components | | — | 1–5% |
| 5 | A + B | dispersibility of large flakes is poor | — | — | 1–10% |
| 6 | A + C | like C | | — | **) |
| 7 | A + D | like D | | — | 1–5% |
| 8 | B + C | like B, high dust component, since without binder | | — | 5–10% |

TABLE 1-continued

Combinations of the process steps mixer (A), compactor (B), screen granulator (C), pan granulator (D)
Examination of the properties of the granulated materials, flow behaviour and transportability

| No. | Combination | | transport-ability | flow test | powder component <125μ |
|---|---|---|---|---|---|
| 9 | B + D | dispersibility of large flakes is poor | | − | 1–3% |
| 10 | C + D | like D | | − | 1–5% |
| 11 | A + B + C | like B + C | − | − | 5% |
| 12a | A + C + D | high throughput on the rotating pan like 14 → only transportable with strong knocking | − *) | − | 0.5% |
| 12b | A + C + D | low throughput → good dispersibility, good flow behaviour | + | + | <0.5% |
| 13 | B + C + D | low strength, since without binder | | + | 2–5% |
| 14 | A + B + C + D | good dispersibility, good flow and transport behaviour, no recycle of dust components necessary | + | ++ | <0.5% |

*)only transportable with strong knocking
**)sieve analysis impossible, as a result of too low a strength, abrasion and formation of granules on the sieve

What is claimed is:

1. Process for the colouration of organic media with granulated inorganic pigments, wherein inorganic pigments are granulated in a multistage process with the addition of oils having a kinematic viscosity at 40° C. of 1.6 to 1500 mm$^2$/s as binders to form granulated pigments of an average particle size of 0.2 to 2 mm without the recycling of a fines component and the granulated inorganic pigments are then mixed with the organic media and further wherein the inorganic pigments are charged together with the oils to a mixer, the pigment powder thus pretreated is subjected to a compacting stage with line forces of from 0.1 to 15 kN/cm to form flakes having a density of 0.5 to 3.0 g/cm$^3$, the flakes are then broken down by subsequent rough grinding on a screen granulator into pregranulate and powder and these are completely pelletized by rerolling on a rotating pan or in a rotating drum.

2. Process according to claim 1, wherein the organic media are plastics.

3. Process according to claim 2, wherein the plastics comprise at least one material selected from the group consisting of thermoplastics, thermosetting plastics and elastomers.

4. Process according to claim 1, wherein the organic media are polymers with elastomeric properties.

5. Process according to claim 1, wherein the line forces are from 0.5 to 10 kN/cm.

6. Process according to claim 1, wherein iron oxide pigments, titanium dioxide pigments, chromic oxide pigments and/or rutile mixed-phase pigments are used as the inorganic pigments.

7. Process according to claim 1, wherein said oils comprise at least one substance selected from the group consisting of vegetable oils, technical or synthetic oils of paraffinic or naphthenic nature and silicone oils, and said oils are used in an amount of from 0.01 to 10 wt %.

8. Process according to claim 1, wherein the granulated pigments are mixed with liquid synthetic materials.

9. Process according to claim 1, wherein the granulated pigments are used for the production of powder coatings.

10. Process according to claim 2, wherein iron oxide pigments, titanium dioxide pigments, chromic oxide pigments and/or rutile mixed-phase pigments are used as the inorganic pigments.

11. Process according to claim 4, wherein iron oxide pigments, titanium dioxide pigments, chromic oxide pigments and/or rutile mixed-phase pigments are used as the inorganic pigments.

12. Process according to claim 2, wherein said oils comprise at least one substance selected from the group consisting of vegetable oils, technical or synthetic oils of paraffinic or naphthenic nature and silicone oils, and said oils are used in an amount of from 0.01 to 10 wt %.

13. Process according to claim 4, wherein said oils comprise at least one substance selected from the group consisting of vegetable oils, technical or synthetic oils of paraffinic or naphthenic nature and silicone oils, and said oils are used in an amount of from 0.01 to 10 wt %.

* * * * *